United States Patent
Ativanichayaphong et al.

(10) Patent No.: US 8,229,745 B2
(45) Date of Patent: Jul. 24, 2012

(54) CREATING A MIXED-INITIATIVE GRAMMAR FROM DIRECTED DIALOG GRAMMARS

(75) Inventors: Soonthorn Ativanichayaphong, Boca Raton, FL (US); David Jaramillo, Lake Worth, FL (US); Gerald M. McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1152 days.

(21) Appl. No.: 11/163,522

(22) Filed: Oct. 21, 2005

(65) Prior Publication Data

US 2007/0094026 A1  Apr. 26, 2007

(51) Int. Cl.
*G06F 17/28* (2006.01)
*G06F 17/27* (2006.01)
*G06F 17/21* (2006.01)
*G10L 15/00* (2006.01)
*G10L 15/04* (2006.01)
*G10L 15/28* (2006.01)
*G10L 21/00* (2006.01)

(52) U.S. Cl. .......... 704/257; 704/4; 704/9; 704/10; 704/231; 704/240; 704/251; 704/255; 704/270; 704/270.1; 704/275

(58) Field of Classification Search .......... 704/9, 240, 704/251, 257, 270, 270.1, E15.04, 4, 271, 704/275, 231, 255, 10
See application file for complete search history.

(56) References Cited

U.S. PATENT DOCUMENTS

| | | | | |
|---|---|---|---|---|
| 5,797,116 A * | 8/1998 | Yamada et al. | | 704/10 |
| 6,499,013 B1 * | 12/2002 | Weber | | 704/257 |
| 6,631,346 B1 * | 10/2003 | Karaorman et al. | | 704/9 |
| 6,973,429 B2 * | 12/2005 | Smith | | 704/257 |
| 7,328,147 B2 * | 2/2008 | Wang et al. | | 704/9 |
| 7,487,440 B2 * | 2/2009 | Gergic et al. | | 715/234 |
| 2002/0193907 A1 | 12/2002 | Young et al. | | |
| 2002/0198719 A1 | 12/2002 | Gergic et al. | | |
| 2003/0061029 A1 * | 3/2003 | Shaket | | 704/9 |
| 2003/0090513 A1 | 5/2003 | Ramakrishnan | | |
| 2003/0171926 A1 * | 9/2003 | Suresh et al. | | 704/270.1 |
| 2003/0225825 A1 | 12/2003 | Healey et al. | | |
| 2004/0073431 A1 * | 4/2004 | Galanes et al. | | 704/270.1 |
| 2004/0085162 A1 | 5/2004 | Agarwal et al. | | |
| 2004/0162729 A1 | 8/2004 | Strong | | |
| 2004/0186730 A1 | 9/2004 | Sun et al. | | |
| 2004/0217986 A1 | 11/2004 | Hambleton et al. | | |
| 2004/0230637 A1 * | 11/2004 | Lecoueche et al. | | 709/200 |
| 2005/0010393 A1 | 1/2005 | Danieli et al. | | |
| 2005/0075878 A1 | 4/2005 | Balchandran et al. | | |
| 2005/0203747 A1 * | 9/2005 | Lecoeuche | | 704/270.1 |
| 2005/0234720 A1 | 10/2005 | Paillet et al. | | |
| 2005/0278180 A1 * | 12/2005 | O'Neill et al. | | 704/275 |
| 2006/0025997 A1 * | 2/2006 | Law et al. | | 704/257 |
| 2006/0069547 A1 * | 3/2006 | Wang et al. | | 704/10 |
| 2006/0069563 A1 * | 3/2006 | Ju et al. | | 704/252 |
| 2006/0074631 A1 * | 4/2006 | Wang et al. | | 704/9 |
| 2006/0287846 A1 * | 12/2006 | Ollason | | 704/4 |

OTHER PUBLICATIONS

J. Glass and E. Weinstein, "SpeechBuilder: Facilitating Spoken Dialogue System Development," Proceedings of EuroSpeech, Aalborg, Denmark, 2001.*

(Continued)

*Primary Examiner* — Douglas Godbold
*Assistant Examiner* — Edgar Guerra-Erazo
(74) *Attorney, Agent, or Firm* — Wolf, Greenfield & Sacks, P.C.

(57) ABSTRACT

A method of building a mixed-initiative grammar can include receiving one or more conjoin phrases, wherein each conjoin phrase is associated with a selected one of the plurality of directed dialog grammars, and receiving a user input specifying a selected grammar generation technique. The mixed-initiative grammar can be automatically generated, in accordance with the selected grammar generation technique, such that the mixed-initiative grammar specifies an allowable ordering of sets when interpreting a user spoken utterance and whether duplicative phrases are allowable within the user spoken utterance.

17 Claims, 4 Drawing Sheets

OTHER PUBLICATIONS

Bennacef, S.; Devillers, L.; Rosset, S.; Lamel, L.; , "Dialog in the RAILTEL telephone-based system," Spoken Language, 1996. ICSLP 96. Proceedings., Fourth International Conference on , vol. 1, no., pp. 550-553 vol. 1, Oct. 3-6, 1996.*

Ramakrishnan et al., Mixed-initiative interaction=mixed computation, Proceedings of the 2002 ACM SIGPLAN workshop on Partial evaluation and semantics-based program manipulation, Jan. 2002, vol. 37, Issue 3.

Perugini, et al., Personalizing Web sites with mixed-initiative interaction, IT Professional, vol. 5, Issue 2, Mar.-Apr. 2003 pp. 9-15.

Endhanced output facility of conversational systems in mobile phone communication, RD Apr. 2000 n432189 p. 796.

* cited by examiner

```
public $mixInititiativeRule =
        ([depart] from) $departGrammar
        (to  arrive at) $arrivalGrammar
        ([depart] on) $departDate
        ([arrive] on) $arrivalDate
        $seatClass
        ;
```

FIG. 3

```
public $mixInititiativeRule =
        (
                ([depart] from) $departGrammar
                (to | arrive at) $arrivalGrammar
                ([depart] on) $departDate
                ([arrive] on) $arrivalDate
                $seatClass
        )*
        ;
```

FIG. 4

```
public $mixInititiativeRule
                $a[$b][$c]
        |       $a[$c][$b]
        |       $b[$a][$c]
        |       $b[$c][$a]
        |       $c[$a][$b]
        |       $c[$b][$a ]
        ;
$a = ([depart] from) $departGrammar;
$b  (to  arrive at) $arrivalGrammar;
$c  ([depart] on) $departDate;
```

FIG. 5

```
<field name="deptCity">
        <grammar root="departGrammar">
            ...
            public $departGrammar = ...
            .
        </grammar>
</field>
        <field name="arrvCity" slotname="arrivalCityField">
            <grammar root="arrivalGrammar">
            ...
            public $arrivalGrammar = ...
            .
        </grammar>
</field>
<field name="deptDate">
        <grammar root="departDate">
            ...
            public $deptDate = ...
            .
        </grammar>
</field>
<field name="arrvDate">
        <grammar root="arrivalGrammar">
            ...
            public $arrivalGrammar = ...
            .
        </grammar>
</field>
        <field name="seat" slot="seatField">
            <grammar root="seatClass">
            ...
            public $seatClass = ...
            .
        </grammar>
</field>
```

FIG. 6

CREATING A MIXED-INITIATIVE GRAMMAR FROM DIRECTED DIALOG GRAMMARS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to mixed-initiative speech-based systems and, more particularly, to creating grammars for use with such systems.

DESCRIPTION OF THE RELATED ART

Many robust voice applications utilize a form of human-computer interaction referred to as mixed-initiative interaction. Mixed-initiative interaction is a flexible interaction strategy between a user and a computer system in which each party can take a turn at any time to steer or alter the flow of interaction. Mixed-initiative systems provide a more natural, and generally preferred, manner for a user to interact with a computer system.

Within a mixed-initiative speech system, a user can provide different pieces of information in varying order without first being prompted for each individual item of information. The computer system can extract needed items of information from a user spoken utterance and use the items of information to fill in appropriate fields of an electronic form, for example. In illustration, a user can say, "I want to fly from Boston to New York, La Guardia on June $23^{rd}$". A mixed-initiative system can extract needed items of information such as the departure city, the arrival airport, and the date of the flight from that single spoken utterance. By comparison, a directed dialog system would prompt the user for each individual piece of information, one at a time, and perform the data collection in a particular order. In this manner, a directed dialog system effectively "directs" the flow of interaction or dialog without providing the user any opportunity to deviate from the specified flow.

One aspect of developing a mixed-initiative system is the development of a mixed-initiative grammar that will be used for processing user spoken utterances. While modern technologies such as Voice Extensible Markup Language (VoiceXML) support mixed-initiative dialogs, creating a mixed-initiative grammar within VoiceXML remains a complex undertaking. Typically, a mixed-initiative grammar is harder and more complex to develop and maintain than a directed dialog grammar. Such is the case as mixed-initiative grammars typically are built using directed dialog grammars as components. Further complicating mixed-initiative grammar development is the reality that these grammars are developed manually. As such, the creation of a mixed-initiative grammar can be a time consuming and error-prone process.

It would be beneficial to provide a more effective technique for creating mixed-initiative grammars which overcomes the deficiencies described above.

SUMMARY OF THE INVENTION

The present invention provides a method and apparatus for constructing mixed-initiative grammars and further enables the reuse of directed dialog grammars. One embodiment of the present invention can include a method of building a mixed-initiative grammar. The method can include, responsive to receiving a user input, creating a plurality of sets, wherein each set comprises an association of at least one conjoin phrase and at least one directed dialog grammar. The conjoin phrase, when recognized within a user spoken utterance, indicates that the directed dialog grammar associated with the conjoin phrase is to be used to process speech recognized text adjacent to the conjoin phrase within the user spoken utterance. The method also can include prompting the user to select one of a plurality of grammar generation techniques, receiving a user input specifying a selected grammar generation technique, and automatically generating the mixed-initiative grammar. The mixed-initiative grammar can specify an allowable ordering of sets corresponding to an allowable ordering of phrases within the user spoken utterance, and whether duplicative phrases are allowable within the user spoken utterance in accordance with the selected grammar generation technique.

Another embodiment of the present invention can include a method of automatically constructing a mixed-initiative grammar from a plurality of directed dialog grammars. The method can include presenting a graphical user interface including a first section that receives a user input specifying a prefix type of conjoin phrase, a second section that receives a user input specifying a directed dialog grammar that is associated with the prefix type of conjoin phrase, and a third section that receives a user input specifying a suffix type of conjoin phrase that is associated with the directed dialog grammar. The method can include receiving, within the graphical user interface, at least one user input that creates associations between conjoin phrases and directed dialog grammars thereby generating a plurality of sets, wherein each set includes at least one of a prefix or a suffix type of conjoin phrase and at least one directed dialog grammar. The conjoin phrase, when recognized within a user spoken utterance, indicates that the directed dialog grammar associated with the conjoin phrase is to be used to process speech recognized text adjacent to the conjoin phrase within the user spoken utterance. The user can be prompted to select one of a plurality of grammar generation techniques. A user input specifying a selected grammar generation technique can be received. The method further can include automatically generating the mixed-initiative grammar, wherein the mixed initiative grammar specifies an allowable ordering of the plurality of sets corresponding to an allowable ordering of phrases within the user spoken utterance and whether duplicative phrases are allowed within the user spoken utterance according to the selected grammar generation technique.

Another embodiment of the present invention can include a machine readable storage, having stored thereon, a computer program having a plurality of code sections executable by a machine for causing the machine to perform the various steps and methods disclosed herein.

BRIEF DESCRIPTION OF THE DRAWINGS

There are shown in the drawings, embodiments which are presently preferred; it being understood, however, that the invention is not limited to the precise arrangements and instrumentalities shown.

FIG. 3 depicts exemplary code illustrating one variety of mixed-initiative grammar that can be generated in accordance with the inventive arrangements disclosed herein.

FIG. 4 depicts exemplary code illustrating another variety of mixed-initiative grammar that can be generated in accordance with the inventive arrangements disclosed herein.

FIG. 5 depicts exemplary code illustrating yet another variety of mixed-initiative grammar that can be generated in accordance with the inventive arrangements disclosed herein.

FIG. 6 depicts exemplary code illustrating one manner in which a user can select and/or identify directed dialog grammars that are to be included within a mixed-initiative grammar.

DETAILED DESCRIPTION OF THE INVENTION

Figures 1, 2:
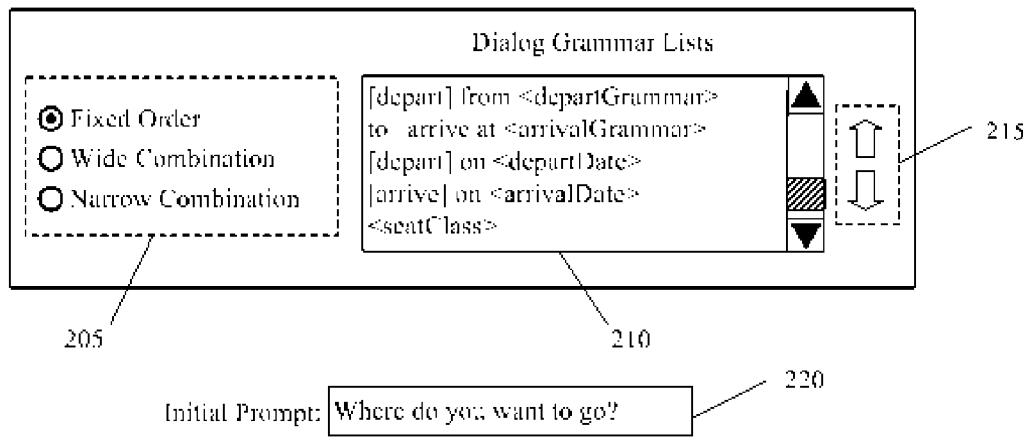
FIG. 1 is a pictorial view of a graphical user interface (GUI) for use in creating a mixed-initiative grammar in accordance with one embodiment of the present invention.
FIG. 2 is a pictorial view of a GUI for use in creating a mixed-initiative grammar in accordance with another embodiment of the present invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention provides a solution for developing a grammar for use by a mixed-initiative computing system. In accordance with the inventive arrangements disclosed herein, directed dialog grammars can be used, and/or reused, to create a mixed-initiative system. The present invention can elicit different items of information needed to create a mixed-initiative grammar from a user or software developer. In one embodiment, for example, one or more directed dialog grammars can be identified as well as various conjoin phrases. The conjoin phrases can be used to link selected ones of the directed dialog grammars. Using one of a plurality of different grammar generation techniques, a mixed-initiative grammar can be generated automatically from the user specified information, thereby reducing and/or eliminating many of the complexities typically associated with the manual creation of a mixed-initiative grammar.

In one embodiment, the inventive arrangements disclosed herein can be implemented within, or as part of, a software-based development system. For example, the various embodiments disclosed herein can be implemented as part of a software development system such as WebSphere® Voice Toolkit V6.0 (hereafter "Voice Toolkit"). Voice Toolkit is a software development platform that is available from International Business Machines Corporation of Armonk, N.Y. (IBM) which provides support for developing voice-enabled applications. Voice Toolkit provides a graphical grammar builder for visual composition of a grammar file for speech recognition, a communication flow builder that supports reusable dialog components, support for Voice Extensible Markup Language (VoiceXML), and/or other functions.

It should be appreciated that while the embodiments disclosed herein can be implemented as part of Voice Toolkit, such is but one embodiment. The present invention is not intended to be limited by the particular host application used as the embodiments disclosed herein can be provided as part of any suitable software-development system and/or environment. Moreover, it should be appreciated that the embodiments disclosed herein can be implemented as a standalone software development system or application.

FIG. 1 is a pictorial view of a graphical user interface (GUI) 100 for use in creating a mixed-initiative grammar in accordance with one embodiment of the present invention. GUI 100 can include a plurality of different field types 105, 110, and 115. Fields 105 and 115 can receive user inputs specifying various conjoin phrases. As shown, prefix type phrases can be received or specified in fields 105, while suffix type phrases can be specified in fields 115. Particular directed dialog grammars can be specified in fields 110. As used herein, a directed dialog grammar can specify one or more words or phrases that are allowable inputs for a particular field of an electronic form to be filled in based upon data extracted or recognized from one or more user spoken utterances.

FIG. 1 illustrates the case where a mixed-initiative grammar is being developed for a voice-enabled airline reservation system. It should be appreciated, however, that the inventive arrangements disclosed herein can be applied to any of a variety of different voice-enabled systems, and that the use of a particular industry in FIG. 1 was intended for purposes of illustration only. Accordingly, FIG. 1 is not intended to limit the present invention, but rather serve as a basis for explaining various aspects of the present invention.

In any case, referring again to fields 105 and 115, a conjoin phrase can serve as a queue indicating that a particular directed dialog grammar be used or, alternatively, to link two or more directed dialog grammars. A conjoin phrase can include one or more words, symbols, or textual elements as the case may be. Accordingly, when recognized within a user spoken utterance, a conjoin phrase indicates that a particular directed dialog grammar is to be used to process a given word or portion of the user spoken utterance. As noted, a conjoin phrase also can function to effectively link, or establish an association or relationship between, two or more directed dialog grammars. Accordingly, a conjoin phrase can establish an ordering between the directed dialog grammars that the conjoin phrase is used to link.

GUI 100 illustrates that the conjoin phrase "depart from", where the word "depart" has been denoted as optional, has been associated with the directed dialog grammar named "departGrammar". This grammar can specify a listing of departure cities. Similarly, the conjoin phrase "depart on", where the word "depart" again is optional, has been associated with the directed dialog grammar named "departDate". This grammar can specify a listing of dates. Thus, if a user says "depart from West Palm Beach on Wednesday", for example, the conjoin phrase "depart from" indicates that the directed dialog grammar named "departGrammar" is to be used to recognized the next several word(s), i.e. "West Palm Beach" from the utterance. When the conjoin phrase "on" is recognized, the speech enabled system would determine that the "departDate" grammar is to be used to recognize the next several words, i.e. "Wednesday" from the utterance.

In this example, both conjoin phrases are classified as prefix phrases. Prefix conjoin phrases indicate that words following after the conjoin phrase within a user spoken utterance are to be processed using a particular directed dialog grammar. Accordingly, the word "Wednesday" is recognized using the "departGrammar". A suffix conjoin phrase indicates that words preceding the conjoin phrase within a user spoken utterance are to be processed using a particular directed dialog grammar. As shown with GUI 100, directed dialog grammars can be associated with a prefix phrase, a suffix phrase, both a prefix and a suffix phrase, or neither type of conjoin phrase.

In one embodiment, directed dialog grammars can be specified by typing the names of the grammars into fields 110 of GUI 100. In another embodiment, drag and drop functionality can be used allowing a portion of code or a directed dialog grammar file to be selected and dropped over any one of fields 110. In yet another embodiment, a file selection navigation window can be opened to allow a user to select the directed dialog grammar(s). Such techniques also can be used to specify conjoin phrases.

FIG. 2 is a pictorial view of a GUI 200 for use in creating a mixed-initiative grammar in accordance with another embodiment of the present invention. GUI 200 allows a user to select any of a plurality of available grammar generation techniques to be used in creating the mixed-initiative grammar. In this case, there are three available grammar generation techniques shown in box 205. These techniques are fixed order, wide combination, and narrow combination.

GUI 200 further can include a field 220 which can receive a user provided input that specifies the initial prompt to be used to solicit information from an end user of the mixed-initiative system being developed. The initial prompt will be used to solicit the end user spoken utterance that will be processed using the mixed-initiative grammar being created. In an embodiment of the present invention using VoiceXML, for example, the prompt can be used with the "initial" tag. The "initial" tag is used within VoiceXML mixed-initiative dialogs to allow the user to fill in form-wide information. The "initial" tag permits the user to skip over a plurality of field prompts with one utterance. Usually, the first prompt in a mixed initiative dialog queries the user for all information. Typically, fields are executed only after it is determined that all field variables have not been filled. The "initial" element does not contain any grammars or filled events of its own; rather, it relies on the grammars and filled elements of each individual field.

The fixed order grammar generation technique is illustrated in view 210 of GUI 200. Using fixed order, a user can specify the particular order in which sets of a conjoin phrase and an associated directed dialog grammar, as specified or created in GUI 100, are ordered within the mixed-initiative grammar being generated. The user can select a particular conjoin phrase-directed dialog grammar set and move it up or down in the ordering using arrows 215. Using this technique, the mixed-initiative grammar will be created in a flat list of component directed dialog grammars.

FIG. 3 depicts exemplary code illustrating one variety of mixed-initiative grammar that can be generated in accordance with the inventive arrangements disclosed herein. More particularly, FIG. 3 illustrates the variety of mixed-initiative grammar that can be generated by the grammar generation tool based upon the options selected as shown with reference to FIG. 2.

FIG. 4 depicts exemplary code illustrating another variety of mixed-initiative grammar that can be generated in accordance with the inventive arrangements disclosed herein. More particularly, FIG. 4 depicts the variety of mixed-initiative grammar that can be generated by the grammar generation tool when the wide combination option is selected as the grammar generation technique. The wide combination grammar generation technique allows the user to say one or more or all of the directed dialog grammars in any ordering.

The wide combination grammar generation technique allows what can be referred to as "unintentional words" or "unintentional phrases" as the case may be. As can be seen in FIG. 4, an "*" syntax is used at the close of the mixed-initiative grammar. The "*" is a standard form of notation within various types of grammars such as Java Application Programming Interface Speech Grammar Format (OSGF), W3C Speech Recognition Grammar Specification (SRGS), Augmented Backus-Naur form (ABNF), or the like, which indicates that an expansion of the grammar can be spoken zero or more times. The term "phrase" as used herein can include one or more words, symbols, portions of text, or the like.

In illustration, the grammar illustrated in FIG. 4 would allow the user to speak the following phrases: "from Boston to Miami on May $1^{st}$" and "on May $1^{st}$ to Miami from Boston". The grammar also would allow the user to say the phrase "from Boston to Miami on May $1^{st}$ from Orlando". This last user spoken utterance includes two instances of the departure city—"from Boston" and "from Orlando". The grammar of FIG. 4 would permit such an utterance. The duplication of the departure city is referred to as an unintentional phrase and is permissible since the expansion of the grammar is allowed to be spoken zero or more times.

FIG. 5 depicts exemplary code illustrating yet another variety of mixed-initiative grammar that can be generated in accordance with the inventive arrangements disclosed herein. In particular, FIG. 5 depicts the variety of mixed-initiative grammar that can be generated by the grammar generation tool when the narrow combination option is selected as the grammar generation technique. The narrow combination option will generate a mixed-initiative grammar that will not only allow a user to say one or more or all of the dialog grammars in any order, but also will remove the list of unintentional phrases that are permissible when using the wide combination technique.

For example, assuming that a mixed-initiative grammar is to be made and that conjoin phrases and directed dialog grammars A, B, and C have been identified, the resulting mixed-initiative grammar would allow the following directed dialog orderings: A, B, C, AB, CA, BC, ABC, BAC, CAB, etc. Orderings such as AABC, AA, BCC, and the like would not, however, be acceptable. In this example, A represents the entire statement "([depart] from) <departGrammar>", B represents the statement "(to | arrive at) <arrivalGrammar>", and C represents "([depart] on) <departDate>". Since unintentional phrases are not permissible, the entire utterance can be rejected if noncompliant or the unintentional phrase(s) can be ignored such that the remaining portion of the utterance can be processed. Notably, either the particular instance of any repeated phrase can be selected for processing based upon developer preference.

FIG. 6 depicts exemplary code illustrating one manner in which a user can select and/or identify those directed dialog grammars that are to be included within the mixed-initiative grammar being generated as well as the fields associated with each directed dialog grammar. Code such as that illustrated in FIG. 6 can be imported by the grammar generation tool, for example, through a file selection dialog or by dragging and dropping a text file including such code into a designated area of a GUI or onto an icon. In another embodiment, a user can drag and drop each individual directed dialog grammar to be included into the mixed-initiative grammar into the tool. In any case, the particular manner in which directed dialog grammars are specified or identified is not intended as a limitation of the present invention.

Figure 7:
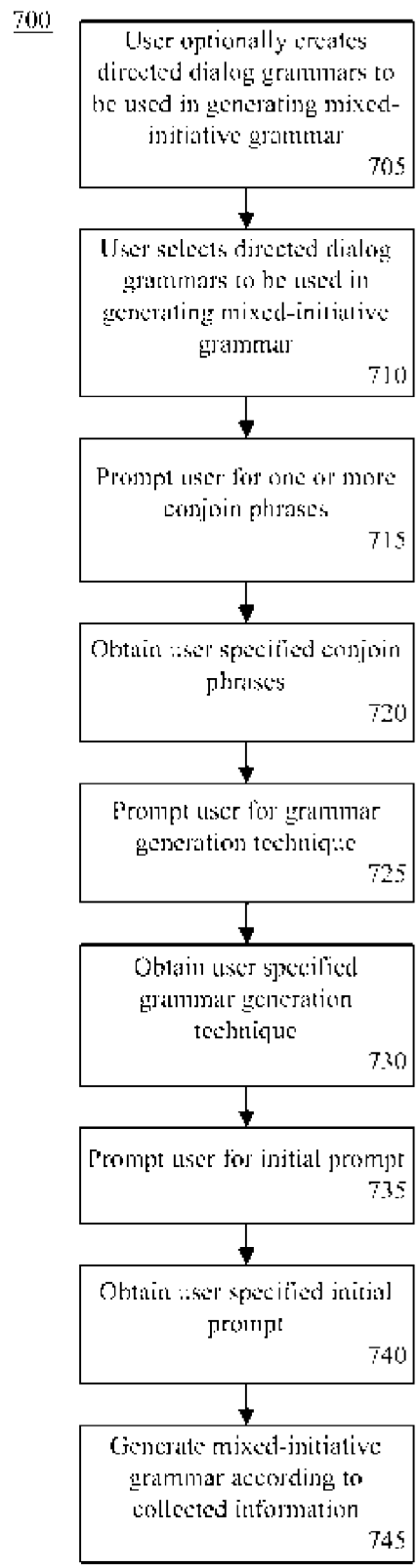
FIG. 7 is a flow chart illustrating a method of creating a mixed-initiative grammar in accordance with another embodiment of the present invention.

FIG. 7 is a flow chart illustrating a method 700 of creating a mixed-initiative grammar in accordance with yet another embodiment of the present invention. Method 700 can begin in step 705, where a user optionally can create one or more directed dialog grammars to be used in generating a mixed-initiative grammar for use with a mixed-initiative speech based system.

In step 710, the user can select one or more of the directed dialog grammars to be used in generating the mixed-initiative grammar. Since step 705 was optional in nature, the directed dialog grammars identified in step 710 need not have been created by the user, but may have been created by other developers. Accordingly, in step 710, the user can select one or more directed dialog grammars that are in existence, whether or not the user created the directed dialog grammars.

In step 715, the user can be prompted for one or more conjoin phrases. In step 720, a user input specifying one or more conjoin phrases can be received. It should be appreciated that the user input can be provided in such a way that not only are one or more conjoin phrases specified, but the conjoin phrases further can be associated with user specified directed dialog grammars, i.e. selected ones of those identified in step 710. In any case, steps 715 and 720 can be optional in nature as conjoin phrases may be excluded from a mixed-initiative grammar depending upon the particular grammar generation technique selected.

In step 725, the grammar generation tool can prompt the user for a specific grammar generation technique. In step 730, the user specified grammar generation technique can be received from the user as an input. In step 735, the grammar generation tool can prompt the user for an initial prompt to be used to solicit information from an end user. In step 740, the user specified initial prompt can be obtained or received from the user. In step 745, the grammar generation tool can generate the mixed-initiative grammar based upon the inputs and/or selections provided by the user. As noted, the order in which users are allowed to speak particular phrases, as dictated by the ordering of directed dialog grammars specified by the mixed-initiative grammar, can be dictated according to the grammar generation technique selected by the user.

It should be appreciated that the various GUI's, flow charts, and example portions of code disclosed herein have been provided for purposes of illustration only and, as such, are not intended to limit the scope of the present invention in any way. With respect to the GUI's, for example, different controls, visual indicators, and the like can be used in lieu of those shown and/or discussed. Similarly, with respect to the flow chart, various steps can be omitted or performed in a different order than described without departing from the spirit of the invention.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of building a mixed-initiative grammar comprising:

responsive to receiving a user input, creating a plurality of sets, wherein each set comprises an association of at least one conjoin phrase and at least one directed dialog grammar, wherein the at least one conjoin phrase, when recognized within a user spoken utterance, indicates that the at least one directed dialog grammar associated with the at least one conjoin phrase is used when processing speech recognized text adjacent to the at least one conjoin phrase within the user spoken utterance;

prompting the user to select from among at least two grammar generation techniques, wherein the at least two grammar generation techniques are selected from a group consisting of a fixed order technique, a wide combination technique, and a narrow combination technique;

receiving a user input specifying one of the at least two grammar generation techniques; and automatically generating the mixed-initiative grammar, wherein the mixed-initiative grammar specifies an allowable ordering of the plurality of sets corresponding to an allowable ordering of phrases within the user spoken utterance and specifies whether duplicative phrases are allowable within the user spoken utterance in accordance with the selected grammar generation technique.

2. A method of automatically constructing a mixed-initiative grammar from a plurality of directed dialog grammars, said method comprising:

presenting a graphical user interface comprising a first section that receives a user input specifying a prefix type of conjoin phrase, a second section that receives a user input specifying a directed dialog grammar that is associated with the prefix type of conjoin phrase, and a third section that receives a user input specifying a suffix type of conjoin phrase that is associated with the directed dialog grammar;

receiving, within the graphical user interface, at least one user input associating conjoin phrases with directed dialog grammars thereby generating a plurality of sets, wherein each set comprises a prefix and/or a suffix type of conjoin phrase and a directed dialog grammar, wherein the conjoin phrase, when recognized within a user spoken utterance, indicates that the directed dialog grammar associated with the conjoin phrase is used when processing speech recognized text adjacent to the conjoin phrase within the user spoken utterance;

prompting the user to select from among at least two grammar generation techniques, wherein the at least two grammar generation techniques are selected from a group consisting of a fixed order technique, a wide combination technique, and a narrow combination technique;

receiving a user input specifying one of the at least two grammar generation techniques; and automatically generating the mixed-initiative grammar, wherein the mixed initiative grammar specifies an allowable ordering of the plurality of sets corresponding to an allowable ordering of phrases within the user spoken utterance and specifies whether duplicative phrases are allowed within the user spoken utterance according to the selected grammar generation technique.

3. A non-transitory computer readable medium encoded with a plurality of instructions that, when executed by a computer, performs a method comprising:

responsive to receiving a user input, creating a plurality of sets, wherein each set comprises an association of at least one conjoin phrase and at least one directed dialog grammar, wherein the at least one conjoin phrase, when recognized within a user spoken utterance, indicates that the at least one directed dialog grammar associated with the at least one conjoin phrase is to be used when processing speech recognized text adjacent to the at least one conjoin phrase within the user spoken utterance;

prompting the user to select from among at least two grammar generation techniques, wherein the at least two grammar generation techniques are selected from a group consisting of a fixed order technique, a wide combination technique, and a narrow combination technique;

receiving a user input specifying one of the at least two grammar generation techniques; and automatically generating the mixed-initiative grammar, wherein the mixed-initiative grammar specifies an allowable ordering of sets corresponding to an allowable ordering of phrases within the user spoken utterance and specifies whether duplicative phrases are allowable within the user spoken utterance in accordance with the selected grammar generation technique.

4. The method of claim 1, wherein the selected grammar generation technique specifies that the plurality of sets are used in a fixed order when interpreting the user spoken utterance.

5. The method of claim 1, wherein the selected grammar generation technique specifies that the plurality of sets are used in any order when interpreting the user spoken utterance, wherein the selected grammar generation technique allows duplicative phrases.

6. The method of claim 1, wherein the selected grammar generation technique dictates that the plurality of sets are used in any order when interpreting the user spoken utterance and that duplicative phrases are ignored.

7. The method of claim 1, further comprising prompting a user by displaying a graphical user interface comprising an input area for receiving at least one user-specified prefix type of conjoin phrase that, when recognized within the user spoken utterance, indicates that the directed dialog grammar associated with the prefix type of conjoin phrase is used when processing speech recognized text immediately following the conjoin phrase.

8. The method of claim 1, further comprising prompting a user by displaying a graphical user interface comprising an input area for receiving at least one suffix type of conjoin phrase that, when recognized within the user spoken utterance, indicates that the directed dialog grammar associated with the suffix type of conjoin phrase is used when processing speech recognized text immediately preceding the conjoin phrase.

9. The method of claim 2, wherein the selected grammar generation technique dictates that the plurality of sets are used in a fixed order when interpreting the user spoken utterance.

10. The method of claim 2, wherein the selected grammar generation technique dictates that the plurality of sets are used in any order when interpreting the user spoken utterance, wherein the selected grammar generation technique allows duplicative phrases.

11. The method of claim 2, wherein the selected grammar generation technique dictates that the plurality of sets are used in any order when interpreting the user spoken utterance irrespective of duplicative phrases.

12. The method of claim 2, further comprising, responsive to a prompt, receiving a user input specifying an initial prompt to be played by a mixed-initiative system, wherein the initial prompt elicits a user spoken utterance that is processed using the mixed-initiative grammar created in said generating step.

13. The computer readable medium of claim 3, wherein the selected grammar generation technique specifies that the plurality of sets are used in a fixed order when interpreting the user spoken utterance.

14. The computer readable medium of claim 3, wherein the selected grammar generation technique specifies that the plurality of sets are used in any order when interpreting the user spoken utterance, wherein the selected grammar generation technique allows duplicative phrases.

15. The computer readable medium of claim 3, wherein the selected grammar generation technique dictates that the plurality of sets are used in any order when interpreting the user spoken utterance and that duplicative phrases are ignored.

16. The computer readable medium of claim 3, wherein prompting the user comprises displaying a graphical user interface comprising an input area for receiving at least one user-specified prefix type of conjoin phrase that, when recognized within the user spoken utterance, indicates that the directed dialog grammar associated with the prefix type of conjoin phrase is used when processing speech recognized text immediately following the conjoin phrase.

17. The computer readable medium of claim 3, wherein prompting the user comprises displaying a graphical user interface comprising an input area for receiving at least one suffix type of conjoin phrase that, when recognized within the user spoken utterance, indicates that the directed dialog grammar associated with the suffix type of conjoin phrase is used when processing speech recognized text immediately preceding the conjoin phrase.

* * * * *